(12) United States Patent
Fandrich et al.

(10) Patent No.: US 6,648,927 B1
(45) Date of Patent: Nov. 18, 2003

(54) OVERLAP VACUUM FORMED PLASTIC CAPACITOR CASE

(75) Inventors: Gregory Scott Fandrich, Easley, SC (US); Thomas Flavian Strange, Easley, SC (US); Thomas V. Graham, Greenville, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 23 days.

(21) Appl. No.: 09/865,975

(22) Filed: May 25, 2001

(51) Int. Cl.[7] .................... H01G 9/00; B27N 3/18; B29C 13/00
(52) U.S. Cl. .................. 29/25.03; 264/319; 264/272.18
(58) Field of Search ................... 264/272.11, 319, 264/272.14, 272.18; 156/285, 286; 29/25.01–25.03; 361/517–519, 535–541

(56) References Cited

U.S. PATENT DOCUMENTS

| | | | |
|---|---|---|---|
| 4,060,670 A | * | 11/1977 | Tamminen |
| 4,268,942 A | * | 5/1981 | Meal et al. |
| 4,439,810 A | * | 3/1984 | Shimada et al. |
| 4,488,203 A | * | 12/1984 | Muranaka et al. |
| 5,131,388 A | | 7/1992 | Pless et al. ............. 128/419 D |
| 5,522,851 A | | 6/1996 | Fayram ........................ 607/5 |
| 6,297,943 B1 | | 10/2001 | Carson ....................... 361/500 |

* cited by examiner

Primary Examiner—Ha Tran Nguyen
(74) Attorney, Agent, or Firm—Steven M. Mitchell

(57) ABSTRACT

The present invention is directed to a method of encasing electrolytic capacitor stacks or wound rolls to form an external package. First, a plastic sheet is heated to its soft transition temperature. Next, the plastic sheet is draped over a preassembled capacitor stack or wound roll. Then, a vacuum is applied to the capacitor stack or wound roll, such that the sheet is formed around the stack or wound roll. Finally, the plastic sheet is allowed to cool. This process results in a vacuum formed plastic capacitor case assembly which minimizes wasted volume in the capacitor package and minimizes capacitor assembly time.

12 Claims, 1 Drawing Sheet

OVERLAP VACUUM FORMED PLASTIC CAPACITOR CASE

BACKGROUND OF THE INVENTION

1. Field of the Invention

The present invention relates generally to a method of encasing electrolytic capacitor stacks or wound rolls, and more particularly to a method of vacuum forming a plastic sheet over an electrolytic capacitor stack or wound roll to form an external package.

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator.

Electrolytic capacitors are used in ICDs because they have the most nearly ideal properties in terms of size, reliability and ability to withstand relatively high voltage. Conventionally, such electrolytic capacitors include an etched aluminum foil anode, an aluminum foil or film cathode, and an interposed kraft paper or fabric gauze separator impregnated with a solvent-based liquid electrolyte. While aluminum is the preferred metal for the anode plates, other metals such as tantalum, magnesium, titanium, niobium, zirconium and zinc may be used. A typical solvent-based liquid electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate may be rolled up into the form of a substantially cylindrical body, or wound roll, that is held together with adhesive tape and is encased, with the aid of suitable insulation, in a metallic tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in U.S. Pat. No. 5,131,388.

Since these capacitors must typically store approximately 30–40 joules, their size can be relatively large, and it is difficult to package them in a small implantable device. Currently available ICDs are relatively large (over 44 cubic centimeters (cc)), generally rectangular or cylindrical devices about 12–16 millimeters (mm) thick. A patient who has such an implantable device may often be bothered by the presence of the large object in his or her pectoral region. Furthermore, the generally rectangular or cylindrical shape can in some instances lead to pocket erosion at the somewhat curved corners of the device. For the comfort of the patient, it is desirable to make smaller and more rounded ICDs. The size and configuration of the capacitors has been a major stumbling block in achieving this goal. In ICDs, as in other applications where space is a critical design element, it is desirable to minimize the wasted volume in the capacitor package.

Conventional capacitor cases using metallic cases are generally known, such as those disclosed in U.S. Pat. No. 5,522,851 issued to Fayram, however significant reductions in capacitor package volume have not been possible with such metal capacitor cases. Metallic capacitor cases act as conductors carrying a negative charge. Thus, edge margins providing spacing between the metallic case and positively charged anodes are necessary to prevent electrical connection between the metallic case and anodes, wasting volume and increasing the size of the capacitor package. Furthermore, metallic cases of reduced dimensions must be machined to very precise tolerances, prolonging new product development time and assembly time. For these reasons, capacitors using such metallic cases are particularly expensive. Thus, there is a need for an improved method of encasing capacitor stacks or wound rolls.

SUMMARY OF THE INVENTION

The present invention is directed to a method of vacuum forming a plastic sheet over an electrolytic capacitor stack or wound roll to form an external package and to electrolytic capacitors made according to such method.

In one embodiment, a thin plastic sheet is heated to its soft transition temperature. The heated plastic sheet is then draped over an assembled capacitor stack or wound roll. Next, a vacuum is applied, causing the plastic to pull tightly around the capacitor stack or wound roll. The plastic is then allowed to cool to form a capacitor case. According to the present invention, a frame may be used to secure the plastic sheet during heating and a support fixture may be employed to support the assembled capacitor stack or wound roll while the plastic sheet is draped over and formed to the capacitor stack or wound roll.

The method of the present invention minimizes wasted volume in the capacitor package and minimizes capacitor assembly time. The volume of the capacitor package is minimized because the plastic case is formed directly onto the internal functioning components of the capacitor. Furthermore, since the plastic case is not a conductor, additional space is saved as no edge margin, or spacing between the capacitor and the case, is required. Additionally, whereas in most vacuum formed articles a male form tool must be used to form the plastic sheet into the desired shape and then the product is inserted into the resulting cavity, forming the plastic sheet directly onto the capacitor according to the present invention can be done without the use of a male form tool, further decreasing assembly time and cost.

BRIEF DESCRIPTION OF THE FIGURES

The foregoing and other features and advantages of the invention will be apparent from the following, more particular description of a preferred embodiment of the invention, as illustrated in the accompanying drawing.

DETAILED DESCRIPTION OF THE PREFERRED EMBODIMENTS

Figure 1:
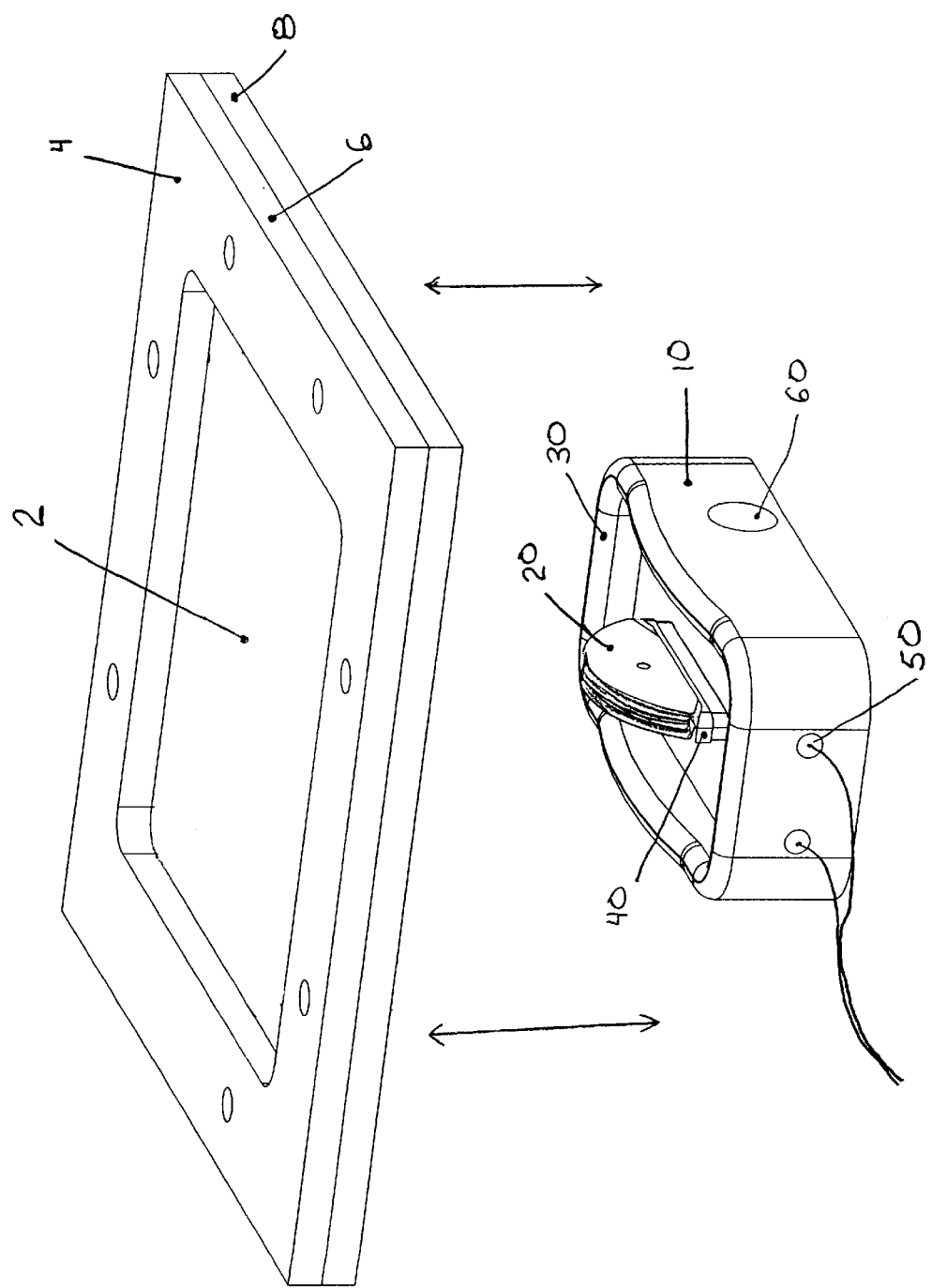
FIG. 1. is a perspective view of a plastic sheet and a capacitor stack of the present invention.

A preferred embodiment of the present invention is now described with reference to the drawing figure where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

The present invention provides for a method of encasing a capacitor stack or wound roll in a vacuum formed plastic sheet. In a preferred embodiment, a thin plastic sheet 2 is secured in a frame 4, as shown in FIG. 1. Preferably, plastic sheet 2 is between 0.25 and 1.0 millimeters thick, although other thicknesses could be used, as would be apparent to one skilled in the relevant art, and is preferably made out of High Density Polyethylene (HDPE). In alternate embodiments, plastic sheet 2 could be made out of any deformable plastic material, such as Low Density Polyethylene (LDPE), Polypropylene (PP), or other thermoplastic sheet, as would be apparent to one skilled in the relevant art.

Frame 4 may be constructed of wood, metal, plastic, or any other durable material as would be apparent to one skilled in the relevant art, preferably aluminum. In the embodiment shown in FIG. 1, frame 4 has an upper piece 6 and a lower piece 8. Plastic sheet 2 is secured between upper piece 6 and lower piece 8 of frame 4. Alternatively, plastic sheet 2 may be secured to frame 4 by other securing devices as would be apparent to one skilled in the relevant art.

Plastic sheet 2 is then heated to its soft transition temperature. Heating may be done by convection oven heating, microwave heating, induction heating, radiant heating or any other known forms of heating as would be apparent to one skilled in the relevant art. In a preferred embodiment, plastic sheet 2 is heated in an infrared heater for approximately 1 minute. In a preferred embodiment, plastic sheet 2 has a soft transition temperature between 90° C. and 140° C.

Once plastic sheet 2 is heated to its soft transition temperature, approximately 140° C., so that it is softened for forming, it is draped over a preassembled capacitor 20. According to the present invention, preassembled capacitor 20 can be a preassembled flat capacitor stack or a rolled capacitor. In the embodiment shown in FIG. 1, capacitor 20 is of a flat capacitor stack design, constructed of anode and cathode layers, stacked with a paper insulator or spacer between each layer. The anode layer is composed of one or more anode foils stacked together without any paper spacer, to form a high energy density anode element. The layers are then grouped together in a parallel relationship to produce sufficient capacitance for the intended function. Attached to each foil is a tab, preferably of aluminum, which electronically connects the foil to other parts of the capacitor. Two terminals are connected to the anode foil and cathode foil by way of these aluminum tabs as would be apparent to one skilled in the relevant art.

In a preferred embodiment, capacitor stack 20 is an aluminum electrolytic flat capacitor stack design with 1 to 4 anodes per layer. Capacitor stack 20 has for its anode, aluminum foil that has been etched and formed at voltages of 400 to 500 volts, with an effective formation voltage of 450 volts for a 400 V capacitor.

In an alternate embodiment of the present invention, capacitor 20 may be a traditionally designed rolled capacitor in either a cylindrical or flattened cylindrical shape. The anode foil in this embodiment typically has a lower capacitance per square centimeter of projected area than a flat capacitor stack design, due to the fact that the anode foil must have enough strength to be rolled. Very thin rolls of aluminum or other valve metal foil are used as the anode and cathode layers, with a separator interposed therebetween. The entire laminate is rolled up into the form of a substantially cylindrical body or wound roll.

In the embodiment shown in FIG. 1, capacitor stack 20 and plastic header 40 are positioned on support fixture 10. The two terminals (not shown) from capacitor stack 20 are passed through header 40 so that they are accessible outside the finished capacitor case. A rubber gasket or the like can be used to seal the holes in header 40 where the terminals pass through. Alternatively, terminal wires can be injection molded to header 40 and soldered or otherwise connected to capacitor stack 20 prior to positioning header 40 and capacitor stack 20 on support fixture 10 as would be apparent to one skilled in the relevant art. Support fixture 10 is used to hold capacitor stack 20 and header 40 in position during the encasing operation. Support fixture 10 may be constructed of wood, metal, plastic, or any other durable material as would be apparent to one skilled in the relevant art, preferably aluminum. In alternate embodiments, capacitor stack 20 may be supported by other supporting devices as would be apparent to one skilled in the relevant art.

After heated plastic sheet 2 is draped over capacitor stack 20, a vacuum seal is created between the plastic sheet 2 and the tooling fence 30. The air around the capacitor stack 20 is then removed through vacuum port 60 to pull the plastic sheet 2 down around the capacitor stack 20. Since the plastic sheet 2 is heated it will melt plastic header 40 and a bond will be created between the plastic sheet 2 and plastic header 40. To help the bonding take place, support fixture 10 may be preheated with core heaters 50 to warm the plastic header 40. If the plastic header 40 is a low density polyethylene material, the support fixture 10 should be heated to approximately 90° C. The vacuum may be applied by any known method as would be apparent to one skilled in the relevant art. In a preferred embodiment, a vacuum forming device, such as a vacuum pump, is used. The vacuum is applied at 25–28 in Hg vacuum pressure for approximately 1 minute.

Next, plastic sheet 2 is allowed to cool. In a preferred embodiment, plastic sheet 2 is cooled for approximately 2 minutes. An air blower or fan may be used to decrease the cooling time. The entire unit of plastic sheet 2 and assembled capacitor stack 20 is then removed from frame 4 and support fixture 10. Any excess plastic may be trimmed from the unit. This process results in a vacuum formed plastic capacitor case assembly. Volume of the capacitor assembly is minimized because the plastic case is formed directly onto capacitor stack 20. Thus, the process results in a low volume, light weight, simple, and cost-effective capacitor assembly.

In the preferred embodiment, after trimming any excess plastic from the vacuum formed unit, the cased capacitor is submersed in an electrolyte solution and vacuum impregnated. The preferred electrolyte is an ethylene glycol based electrolyte solution, but other electrolyte solutions could be used without departing from the scope of the invention, as would be known to those skilled in the relevant art. In the preferred embodiment, a vacuum is applied at 25–28 in Hg vacuum pressure for approximately 20 minutes. A preformed hole in header 40 (not shown) enables the electrolyte to enter the cased capacitor as air is removed from the case by the vacuum, so that the electrolyte is absorbed into capacitor stack 20. After the vacuum impregnation, the hole can be sealed by a silicone sealant, heat sealing or the like. Alternatively, capacitor stack 20 can be impregnated with an electrolyte solution prior to vacuum forming plastic sheet 2 over capacitor stack 20.

Capacitors according to the present invention can be incorporated into implantable medical devices, such as implantable cardiac defibrillators (ICDs), as would be apparent to one skilled in the art, as described in U.S. Pat. No. 5,522,851.

This method of encasing a capacitor stack or wound roll in a vacuum formed plastic sheet has many advantages over previous capacitor encasing methods. This method minimizes wasted volume in the capacitor package. The volume of the capacitor package is minimized because the plastic case is formed directly onto the internal functioning components of the capacitor. Furthermore, since the plastic case is not a conductor, additional space is saved as no edge margin, or spacing between the capacitor and the case, is required.

Additionally, this improved method of encasing a capacitor stack or wound roll minimizes capacitor assembly time. Generally, designing a case for a capacitor stack or wound roll adds several weeks to new product development time because the volume of the case must be machined to very precise tolerances, including edge margins, or spacing between the capacitor and the case. This improved method of encasing a capacitor stack or wound roll solves this problem by vacuum forming a plastic sheet directly onto a capacitor. Additionally, whereas in most vacuum formed articles a male form tool must be used to form the plastic sheet into the desired shape and then the product is inserted into the resulting cavity, forming the plastic sheet directly onto the capacitor according to the present invention can be done without the use of a male form tool, further decreasing assembly time and cost.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, and without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A method of encasing an electrolytic capacitor, comprising the following steps:
    (a) heating a plastic sheet;
    (b) placing said heated plastic sheet over said electrolytic capacitor; and
    (c) applying a vacuum to said plastic sheet and said electrolytic capacitor, such that said plastic sheet is formed around said electrolytic capacitor.

2. A process according to claim 1, wherein step (b) further comprises securing said plastic sheet to a frame.

3. A process according to claim 1, wherein step (b) further comprises loading said electrolytic capacitor onto a support fixture.

4. A process according to claim 1, wherein said plastic sheet is heated to its soft transition temperature during step (a).

5. A process according to claim 1, further comprising the following step:
    (d) allowing said formed plastic sheet to cool.

6. A process according to claim 1, wherein said electrolytic capacitor is a preassembled electrolytic capacitor stack.

7. A process according to claim 1, wherein said electrolytic capacitor is a preassembled wound roll electrolytic capacitor.

8. A process according to claim 1, wherein step (b) further comprises connecting a header to said electrolytic capacitor and loading said electrolytic capacitor and header onto a support fixture.

9. A process according to claim 8, wherein step (c) further includes bonding said plastic sheet to said header.

10. A process according to claim 9, wherein said bonding step includes heating said header.

11. A method of encasing an electrolytic capacitor, comprising the following steps:
    (a) heating a plastic sheet;
    (b) placing said heated plastic sheet over said electrolytic capacitor and a plastic header connected to said electrolytic capacitor;
    (c) applying a vacuum to said plastic sheet and said electrolytic capacitor, such that said plastic sheet is formed around said electrolytic capacitor and bonded to said plastic header.

12. The method according to claim 11 and further including the step of heating said plastic header prior to step (b) to promote bonding by melting between said plastic sheet and said plastic header.

* * * * *